US009705235B2

(12) United States Patent
Finke et al.

(10) Patent No.: US 9,705,235 B2
(45) Date of Patent: Jul. 11, 2017

(54) APPARATUS HAVING A CONNECTOR WITH ISOLATED CONDUCTIVE PATHS

(71) Applicants: Halliburton Energy Services, Inc, Houston, TX (US); Greene, Tweed of Delaware, Inc., Wilmington, DE (US)

(72) Inventors: Michael Dewayne Finke, Cypress, TX (US); Jesse Kevin Hensarling, Cleveland, TX (US); Randal Thomas Beste, Katy, TX (US); Charles Pence Burke, Magnolia, TX (US); James Neal Spence, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/308,476

(22) Filed: Jun. 18, 2014

(65) Prior Publication Data

US 2014/0302721 A1 Oct. 9, 2014

Related U.S. Application Data

(60) Division of application No. 13/857,489, filed on Apr. 5, 2013, now Pat. No. 8,844,127, which is a (Continued)

(51) Int. Cl.
*B23P 19/00* (2006.01)
*H01R 43/20* (2006.01)
(Continued)

(52) U.S. Cl.
CPC ........... *H01R 13/52* (2013.01); *H01R 13/516* (2013.01); *H01R 13/5221* (2013.01);
(Continued)

(58) Field of Classification Search
CPC ........... H01R 13/6315; Y10T 29/49204; Y10T 29/49208; Y10T 29/4922; Y10T 29/5193; Y10T 29/53209; B23K 9/28; H02G 3/0616; H02G 3/061
USPC ....... 29/883, 876, 879, 882, 747, 33 M, 754, 29/757; 285/342, 348; 439/190, 194, 439/271, 448, 506, 578, 581, 607.41, 700
See application file for complete search history.

(56) References Cited

U.S. PATENT DOCUMENTS 2,750,569 A 6/1956 Moon et al.
4,144,404 A 3/1979 De Groef et al.
(Continued)

OTHER PUBLICATIONS

"U.S. Appl. No. 11/175,018, Amendment filed Sep. 27, 2012 in response to Decision on Appeal mailed Jul. 30, 2012", 5 pgs.
(Continued)

*Primary Examiner* — Thiem Phan

(57) ABSTRACT

An apparatus includes a pair of connectors and two or more conductive paths formed in each connector in the pair of connectors. The pair of connectors includes a first connector and a second connector. The first connector is substantially more flexible than the second connector, and each connector in the pair of connectors includes a bulkhead. Each of the two or more conductive paths in each connector in the pair of connectors is electrically isolated from all other conductive elements in the respective connector. A shroud may be located between the bulkheads and disposed about the pair of connectors when the pair of connectors are coupled together electrically.

6 Claims, 5 Drawing Sheets

Related U.S. Application Data continuation of application No. 13/165,314, filed on Jun. 21, 2011, now Pat. No. 8,413,325, which is a division of application No. 11/175,018, filed on Jul. 5, 2005, now abandoned.

(60) Provisional application No. 60/653,720, filed on Feb. 17, 2005.

(51) Int. Cl.
*H01R 13/52* (2006.01)
*H01R 13/631* (2006.01)
*H01R 13/516* (2006.01)
*H01R 43/16* (2006.01)

(52) U.S. Cl.
CPC ......... *H01R 13/6315* (2013.01); *H01R 43/16* (2013.01); *Y10T 29/4922* (2015.01); *Y10T 29/49123* (2015.01); *Y10T 29/49204* (2015.01); *Y10T 29/49208* (2015.01); *Y10T 29/49213* (2015.01); *Y10T 29/49218* (2015.01); *Y10T 29/5193* (2015.01); *Y10T 29/53209* (2015.01)

(56) References Cited

U.S. PATENT DOCUMENTS

| | | | |
|---|---|---|---|
| 4,173,384 | A | 11/1979 | Phillips |
| 4,426,127 | A | 1/1984 | Kubota |
| 4,553,807 | A | 11/1985 | Cane |
| 5,131,464 | A | 7/1992 | Lenhart et al. |
| 5,358,418 | A | 10/1994 | Carmichael |
| 5,645,438 | A | 7/1997 | Cairns |
| 5,669,637 | A | 9/1997 | Chitty et al. |
| 6,436,050 | B2 | 8/2002 | Garrison et al. |
| 6,494,739 | B1 | 12/2002 | Vivenzio et al. |
| 6,773,312 | B2 | 8/2004 | Bauer et al. |
| 6,948,976 | B2 | 9/2005 | Goodwin et al. |
| 7,980,874 | B2 | 7/2011 | Finke et al. |
| 8,413,325 | B2 | 4/2013 | Finke et al. |
| 8,756,807 | B2 | 6/2014 | Finke et al. |
| 8,844,127 | B2 | 9/2014 | Finke et al. |
| 2006/0183373 | A1 | 8/2006 | Finke et al. |
| 2010/0087092 | A1 | 4/2010 | Finke et al. |
| 2011/0252643 | A1 | 10/2011 | Finke et al. |
| 2013/0217266 | A1 | 8/2013 | Finke et al. |
| 2013/0219715 | A1 | 8/2013 | Finke et al. |

OTHER PUBLICATIONS

"U.S. Appl. No. 13/857,489, Preliminary Amendment filed Apr. 8, 2013", 7 pgs.
U.S. Appl. No. 11/175,018, filed Jul. 5, 2005, Connector Including Isolated Conductive Paths.
"U.S. Appl. No. 11/175,018, Advisory Action mailed Feb. 23, 2007", 3 pgs.
"U.S. Appl. No. 11/175,018, Appeal Brief filed Mar. 19, 2009", 20 pgs.
"U.S. Appl. No. 11/175,018, Appeal Decision mailed Jul. 30, 2012", 6 pgs.
"U.S. Appl. No. 11/175,018, Examiner's Answer to Appeal Brief mailed Sep. 9, 2009", 7 pgs.
"U.S. Appl. No. 11/175,018, Final Office Action mailed Feb. 19, 2008", 8 pgs.
"U.S. Appl. No. 11/175,018, Final Office Action mailed Aug. 29, 2006", 7 pgs.
"U.S. Appl. No. 11/175,018, Non Final Office Action mailed Mar. 20, 2006", 8 pgs.
"U.S. Appl. No. 11/175,018, Non Final Office Action mailed May 30, 2007", 7 pgs.
"U.S. Appl. No. 11/175,018, Notice of Appeal filed Aug. 19, 2008", 1 pg.
"U.S. Appl. No. 11/175,018, Response filed Jan. 25, 2007 to Final Office Action mailed Aug. 29, 2006", 9 pgs.
"U.S. Appl. No. 11/175,018, Response filed Jun. 20, 2006 to Non Final Office Action mailed Mar. 20, 2006", 9 pgs.
"U.S. Appl. No. 11/175,018, Response filed Nov. 20, 2007 to Non-Final Office Action mailed May 30, 2007", 10 pgs.
"U.S. Appl. No. 12/633,274, Non-Final Office Action mailed Jul. 21, 2010", 9 pgs.
"U.S. Appl. No. 12/633,274, Notice of Allowance mailed Mar. 15, 2011", 7 pgs.
"U.S. Appl. No. 12/633,274, Response filed Dec. 21, 2010 to Non Final Office Action mailed Jul. 21, 2010", 10 pgs.
"U.S. Appl. No. 12/633,274, Supplemental Notice of Allowability mailed Apr. 26, 2011", 2 pgs.
"U.S. Appl. No. 12/633,274,, Preliminary Amendment filed Dec. 8, 2009", 8 pgs.
"U.S. Appl. No. 13/165,314, Non Final Office Action mailed Jul. 13, 2012", 8 pgs.
"U.S. Appl. No. 13/165,314, Notice of Allowance mailed Dec. 7, 2012", 5 pgs.
"U.S. Appl. No. 13/165,314, Response filed Apr. 26, 2012 to Restriction Requirement mailed Mar. 26, 2012", 6 pgs.
"U.S. Appl. No. 13/165,314, Response filed Oct. 15, 2012 to Non Final Office Action mailed Jul. 13, 2012", 11 pgs.
"U.S. Appl. No. 13/165,314, Restriction Requirement mailed Mar. 26, 2012", 6 pgs.
"U.S. Appl. No. 13/857,489, Non Final Office Action mailed Oct. 7, 2013", 7 pgs.
"U.S. Appl. No. 13/857,489, Notice of Allowance mailed May 23, 2014", 8 pgs.
"U.S. Appl. No. 13/857,489, Response filed Feb. 7, 2014 to Non Final Office Action mailed Oct. 7, 2013", 13 pgs.
"U.S. Appl. No. 13/857,489, Response filed Aug. 13, 2013 to Restriction Requirement mailed Jul. 15, 2013", 8 pgs.
"U.S. Appl. No. 13/857,489, Restriction Requirement mailed Jul. 15, 2013", 8 pgs.
"U.S. Appl. No. 13/857,541, Non Final Office Action mailed Oct. 24, 2013", 7 pgs.
"U.S. Appl. No. 13/857,541, Notice of Allowance mailed Feb. 12, 2014", 5 pgs.
"U.S. Appl. No. 13/857,541, Preliminary Amendment filed Apr. 9, 2013", 5 pgs.
"U.S. Appl. No. 13/857,541, Response filed Jan. 21, 2014 to Non Final Office Action mailed Oct. 24, 2013", 12 pgs.
"U.S. Appl. No. 13/857,541, Response filed Sep. 13, 2013 to Restriction Requirement mailed Aug. 13, 2013", 6 pgs.
"U.S. Appl. No. 13/857,541, Restriction Requirement mailed Aug. 13, 2013", 6 pgs.
"Bulkhead Female Connectors", [online]. (c) 1999 Kemlon Products and Development. [retrieved Jan. 11, 2010]. Retrieved from the Internet: <URL: http://www.kemlon.com/catalogs/duoseel/females.htm>, (1999), 1 pg.

APPARATUS HAVING A CONNECTOR WITH ISOLATED CONDUCTIVE PATHS

RELATED APPLICATION

This application is a divisional application of U.S. patent application Ser. No. 13/857,489, filed Apr. 5, 2013, which is a continuation application of U.S. patent application Ser. No. 13/165,314, filed Jun. 21, 2011, now U.S. Pat. No. 8,413,325, which application is a divisional of U.S. patent application Ser. No. 11/175,018, filed Jul. 5, 2005, now abandoned, which claims the benefit of U.S. Provisional Application Ser. No. 60/653,720 filed Feb. 17, 2005, which applications are incorporated herein by reference in their entireties.

FIELD

The subject matter relates to connectors, and more particularly, to connectors that include isolated conductive paths.

BACKGROUND

Connectors can provide electrical coupling between systems. For example, in a system for capturing information in an oil well, a connector can provide a path for data, such as acoustic data, between electronic modules, such as a data acquisition module, and a data communication module. Connectors used in these applications, or other applications deployed in harsh environments, fail because the connectors are unable to operate when exposed to the heat, pressure, or mechanical stresses encountered in the environment. Failure modes include both mechanical and electrical. Mechanical failures include melting and mechanical distortion. Electrical failures include contact failures due to cyclic mechanical stress. In addition to contributing to a complete system failure, a harsh environment can also cause degradation in the electrical performance or intermittent failures in a connector.

DESCRIPTION

Figure 1:
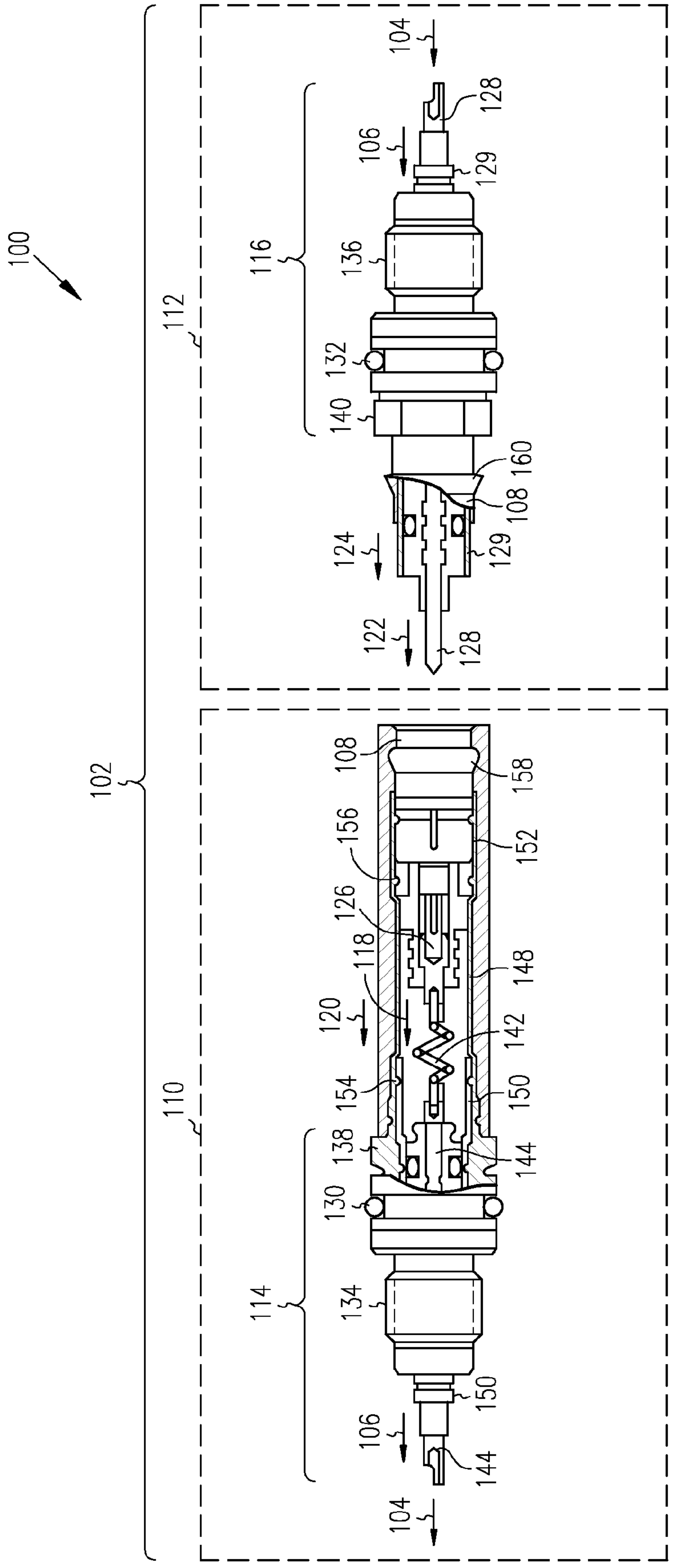
FIG. 1 is a partially cut-away side view of an apparatus including a pair of connectors, conductive paths (shown in more detail in FIG. 2), and a shroud, in accordance with some embodiments of the present invention.

In the following description of some embodiments of the present invention, reference is made to the accompanying drawings which form a part hereof, and in which are shown, by way of illustration, specific embodiments of the present invention which may be practiced. In the drawings, like numerals describe substantially similar components throughout the several views. These embodiments are described in sufficient detail to enable those skilled in the art to practice the present invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1 is a partially cut-away side view of an apparatus 100 including a pair of connectors 102, conductive paths 104 and 106 (shown in more detail in FIG. 2), and a shroud 108 in accordance with some embodiments of the present invention. The pair of connectors 102 includes connectors 110 and 112. The connector 110 includes a bulkhead 114. The connector 112 includes a bulkhead 116. The connector 110 includes conductive paths 118 and 120. The connector 112 includes conductive paths 122 and 124.

The pair of connectors 102 are coupled to together electrically when one of the conductive paths 118 or 120 in the connector 110 is electrically coupled to one of the conductive paths 122 or 124 in the connector 112. When the pair of connectors 102 are coupled together electrically, the conductive path 104 of the pair of connectors 102 includes the conductive path 118 of the connector 110 and the conductive path 122 of the connector 112. In addition, when the pair of connectors 102 are coupled together electrically, the conductive path 106 of the pair of connectors 102 includes the conductive path 120 of the connector 110 and the conductive path 124 of the connector 112. (The conductive paths 118, 120, 122, and 124 are shown in more detail in FIG. 2.) Furthermore, when the pair of connectors 102 are coupled together electrically, the shroud 108 encompasses at least a portion of each of the pair of connectors 102 located between the bulkheads 114 and 116, and the shroud 108 is disposed about the pair of connectors 102.

The pair of connectors 102 includes the connectors 110 and 112. In some embodiments, the connector 110 is a female connector and the connector 112 is a male connector. The connector 110 includes a socket 126 to receive a pin 128 when the connectors 110 and 112 are coupled together electrically. The connector 110 includes the substantially rigid member 152 to receive a substantially rigid member 129 of the connector 112 when the connectors 110 and 112 are coupled together electrically.

The bulkheads 114 and 116, in some embodiments, have a high-temperature and high-pressure rating. An exemplary high temperature rating is about 400 degrees Fahrenheit. An exemplary high pressure rating is about 25,000 pounds per square inch. The bulkheads 114 and 116 include O-rings 130 and 132, respectively. An exemplary O-ring is a one-piece molded elastomeric seal with a circular cross-section that seals by distortion of its resilient elastic compound. Those skilled in the art will appreciate that the O-rings 130 and 132 suitable for use in connection with the bulkheads 114 and 116 in the apparatus 100 can be formed from a variety of materials. A fluorocarbon is one exemplary material suitable for use in fabrication of the O-rings 130 and 132.

The bulkheads 114 and 116, in some embodiments, include a high strength material. Beryllium copper is high strength material suitable for use in connection with the fabrication of the bulkheads 114 and 116. The bulkheads 114 and 116, in some embodiments, include threads 134 and 136, respectively. Non-galling materials are suitable for use in connection with the fabrication of threaded bulkheads. Beryllium copper is one non-galling material suitable for use in connection with the fabrication of the bulkheads 114 and 116.

The bulkheads 114 and 116 include torque members 138 and 140, respectively. The torque members 138 and 140 provide an attachment site for delivering torque to the bulkheads 114 and 116 when they are being inserted and tightened in a threaded receptacle (not shown) or mount (not shown). In some embodiments, the torque members 138 and 140 have hex shape (not shown). The torque members 138 and 140 are formed from an insulative material. An exemplary insulative material suitable for use in fabrication of the torque members 138 and 140 is polyetherether-ketone (PEEK). PEEK is a thermoplastic and can be used continuously to 480° F. (250° C.) and in hot water or steam without permanent loss in physical properties. Those skilled in the art will appreciate that fabrication of the torque members 138 and 140 can include machining molded PEEK to provide the desired geometry for the attachment site of the torque members 138 and 140.

The conductive paths 104 and 106 provide two paths for electrical signals to pass through the connectors 110 and 112, respectively. The conductive path 104 includes the conductive paths 118 and 122 in the pair of connectors 102. The conductive path 106 includes the conductive paths 120 and 124 in the pair of connectors 102. The conductive paths 118, 120, 122, and 124 are not limited to being fabricated from a particular material. Any conductive material is suitable for use in connection with the fabrication of the conductive paths 118, 120, 122, and 124 in the connectors 110 and 112. Metals are conductive materials suitable for use in connection with the fabrication of the conductive paths 118, 120, 122, and 124. One exemplary conductive materials suitable for use in connection with the fabrication of the conductive paths 118, 120, 122, and 124 is beryllium copper. In some embodiments, the material selected for the conductive paths 118, 120, 122, and 124 is coated with gold.

The conductive path 118 in the connector 110 includes a flexible member 142 located between a substantially rigid member 144 and the socket 126. The flexible member 142 is not limited to being formed from a particular flexible structure or a particular material. The flexible member 142, in some embodiments, includes a conductive spring formed from beryllium copper coated with gold. The flexible member 142 is not limited to being coupled to the substantially rigid member 144 and the socket 126 using a particular method. The flexible member 142, in some embodiments, is coupled to the substantially rigid member 144 by crimping. The flexible member 142, in some embodiments, is coupled to the substantially rigid member 144 by soldering. The flexible member 142, in some embodiments, is coupled to the socket 126 by crimping. The flexible member 142, in some embodiments, is coupled to the socket 126 by soldering.

The conductive path 120 in the connector 110 includes a flexible member 148 located between two substantially rigid members 150 and 152. The flexible member 148 is not limited to being formed from a particular flexible structure or a particular material. The flexible member 148, in some embodiments, includes a conductive braided member formed from tin coated copper. The flexible member 148 is not limited to being coupled to the two substantially rigid members 150 and 152 using a particular method. The flexible member 148, in some embodiments, is coupled to one of the two substantially rigid members 150 and 152 by soldering. The soldering is confined substantially to grooves 154 and 156 formed in each of the two substantially rigid members 150 and 152 to which the flexible member 148 is secured by a wrapped wire before soldering. A detailed description of a process for securing the flexible member 148 to the rigid members 150 and 152 is provided below in the description of FIG. 5.

The shroud 108 protects the pair of connectors 102 and the conductive paths 104 and 106 at the interface or junction between the connectors 110 and 112 when the pair of connectors 102 are coupled together electrically. The shroud 108 is formed from a flexible, insulative material. In some embodiments, the shroud 108 is formed from a fluorocarbon. Nubs 158 and 160 are bumps or other distortions on a substantially uniform surface of the connectors 110 and 112, respectively, that prevent sliding of the shroud 108. In some embodiments, the shroud 108 is held in place, at least partially, by the nubs 158 and 160. In some embodiments, hydrostatic pressure may be sufficient to hold the shroud 108 in place during operation of the pair of connectors 102. Thus, the nubs 158 and 160 may not be required. The shroud 108 provides a hermetic seal at the interface or junction between the pair of connectors 102.

Figure 2:
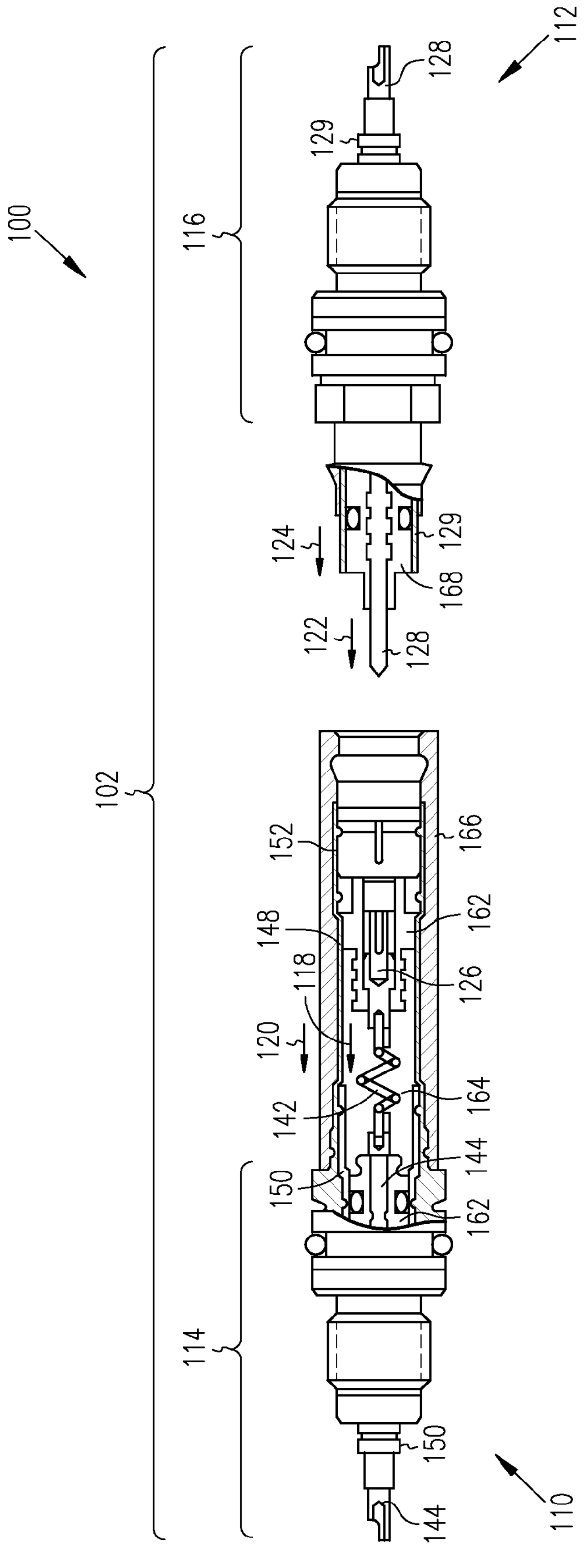
FIG. 2 is a partially cut-away side view of the apparatus shown in FIG. 1 including the pair of connectors and the conductive paths, in accordance with some embodiments of the present invention.

FIG. 2 is a partially cut-away side view of the apparatus 100 shown in FIG. 1 including the pair of connectors 102 and the conductive paths 118, 120, 122, and 124 in accordance with some embodiments of the present invention. The conductive path 118 includes the socket 126, the flexible member 142, and the substantially rigid member 144. The flexible member 142 couples the socket 126 to the substantially rigid member 144. The substantially rigid member 144 provides a conductive path from the flexible member 142 through the bulkhead 114. The conductive path 120 includes the flexible member 148 and the two substantially rigid members 150 and 152. The flexible member 148 couples the two substantially rigid members 150 and 152 together. The substantially rigid member 150 extends through the bulkhead 114. The conductive path 122 includes the pin 128. The pin 128 extends through the bulkhead 116. The conductive path 124 includes the substantially rigid member 129. The substantially rigid member 129 extends through the bulkhead 116.

The conductive path 118 includes the socket 126, the flexible member 142, and the substantially rigid member 144. The socket 126 and the substantially rigid member 144 are substantially surrounded by an insulative material 162, such as PEEK. The flexible member 142 is substantially surrounded by a flexible, insulative material 164, such as rubber.

The conductive path 120 includes the flexible member 148. The flexible member 148 substantially surrounds the flexible, insulative material 164. A flexible sleeve 166 substantially surrounds the flexible member 148. The flexible sleeve 166 is not limited to being fabricated from a particular material. In some embodiments, the flexible sleeve 166 is fabricated from rubber.

Thus, flexibility in the connector 110 is achieved by substantially surrounding the flexible member 142 with a flexible, insulative material 164, substantially surrounding the flexible, insulative material 164 with the flexible member 148, and substantially surrounding the flexible member 148 with the flexible sleeve 166.

The connector 112 includes the pin 128 and the substantially rigid member 129. The pin 128 and the substantially rigid member 129 are separated by an insulative material 168, such as PEEK.

Figure 3:
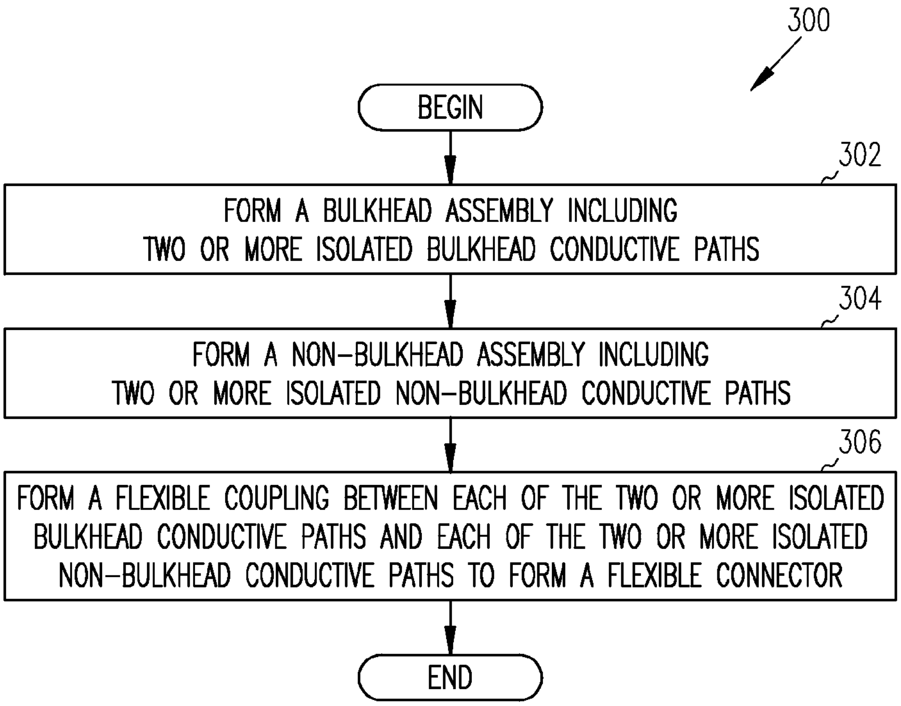
FIG. 3 is a flow diagram of a method of forming the flexible connector, shown in FIG. 1, in accordance with some embodiments of the present invention.

FIG. 3 is a flow diagram of a method 300 of forming the flexible connector 110, shown in FIG. 1 in accordance with some embodiments of the present invention. The method 300 includes forming a bulkhead assembly including two-or-more isolated bulkhead conductive paths (block 302), forming a non-bulkhead assembly including two-or-more isolated non-bulkhead conductive paths (block 304), and forming a flexible coupling between each of the two-or-more isolated bulkhead conductive paths and each of the two-or-more isolated non-bulkhead conductive paths to form a flexible connector (block 306).

In some embodiments, forming the bulkhead assembly including the two-or-more isolated bulkhead conductive paths includes forming a first assembly including one of the two-or-more isolated bulkhead conductive paths, forming a second assembly including one of the two-or-more isolated bulkhead conductive paths, and assembling the first and second assembly. In the first assembly, the one of the two-or-more isolated bulkhead conductive paths is an inner path. In the second assembly, the one of the two-or-more isolated bulkhead conductive paths is an outer path.

In some embodiments, forming the first assembly includes injection molding an insulative material around the inner conductive path to form an inner conductive path assembly. Further, forming the first assembly includes injection molding an insulative material around the outer conductive path to form an outer conductive path assembly. Still further, forming the first assembly includes machining the inner conductive path assembly and the outer conductive path assembly to form a machined inner conductive path assembly and a machined outer path assembly. Finally, forming the first assembly includes assembling the machined inner conductive path assembly and the machined outer conductive path assembly including an O-ring to provide seal between the inner path assembly and the outer path assembly.

In some embodiments, forming the non-bulkhead assembly including the two or more isolated non-bulkhead conductive paths includes assembling a conductive, flexible member and an inner conductive socket. Finally, forming the non-bulkhead assembly includes injection molding insulative material to provide insulation between the inner conductive socket and an outer socket.

In some embodiments, forming the flexible coupling between each of the two or more isolated bulkhead conductive paths and each of the two or more isolated non-bulkhead conductive paths to form the flexible connector includes coupling the conductive, flexible member to the substantially rigid inner conductor of the bulkhead assembly to form a bulkhead and non-bulkhead assembly. Further, forming the flexible coupling includes forming a flexible material around the inner conductive path. Finally, forming the flexible coupling includes assembling conductive braid over the flexible material and forming a flexible sleeve outside the conductive braid.

Figure 4:
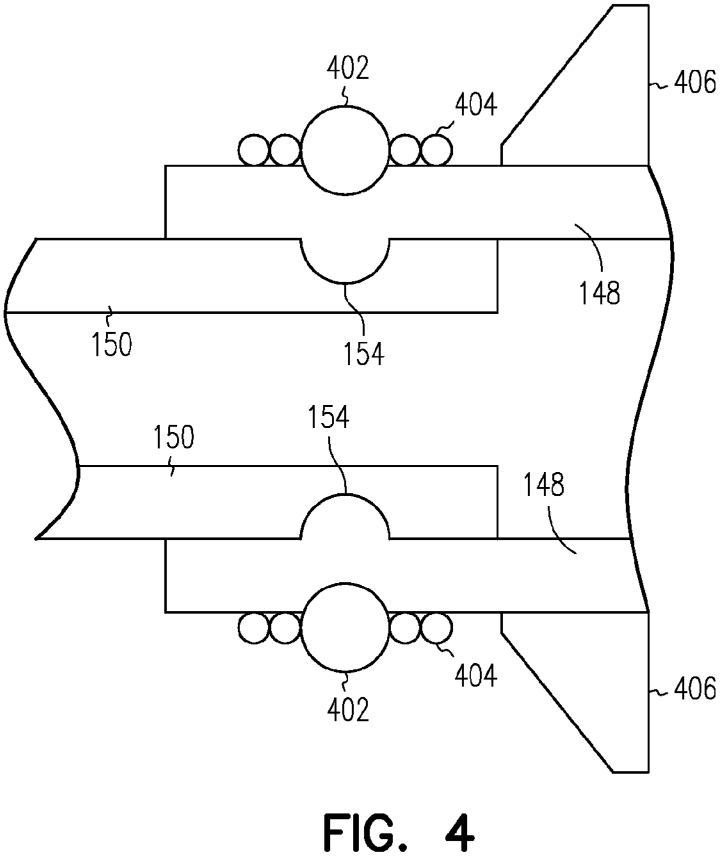
FIG. 4 is a detailed view of the substantially rigid member having the groove and the flexible member included in the connector, shown in FIG. 1, and a wire, solder, and a heatsink for controlling wicking of the solder into the braided flexible member, in accordance with some embodiments of the present invention.

FIG. 4 is a detailed view of the substantially rigid member 150 having the groove 154 and the flexible member 148 included in the connector 110, shown in FIG. 1, and a wire 402, solder 404, and a heatsink 406 for controlling wicking of the solder into the braided flexible member 148, in accordance with some embodiments of the present invention.

Figure 5:
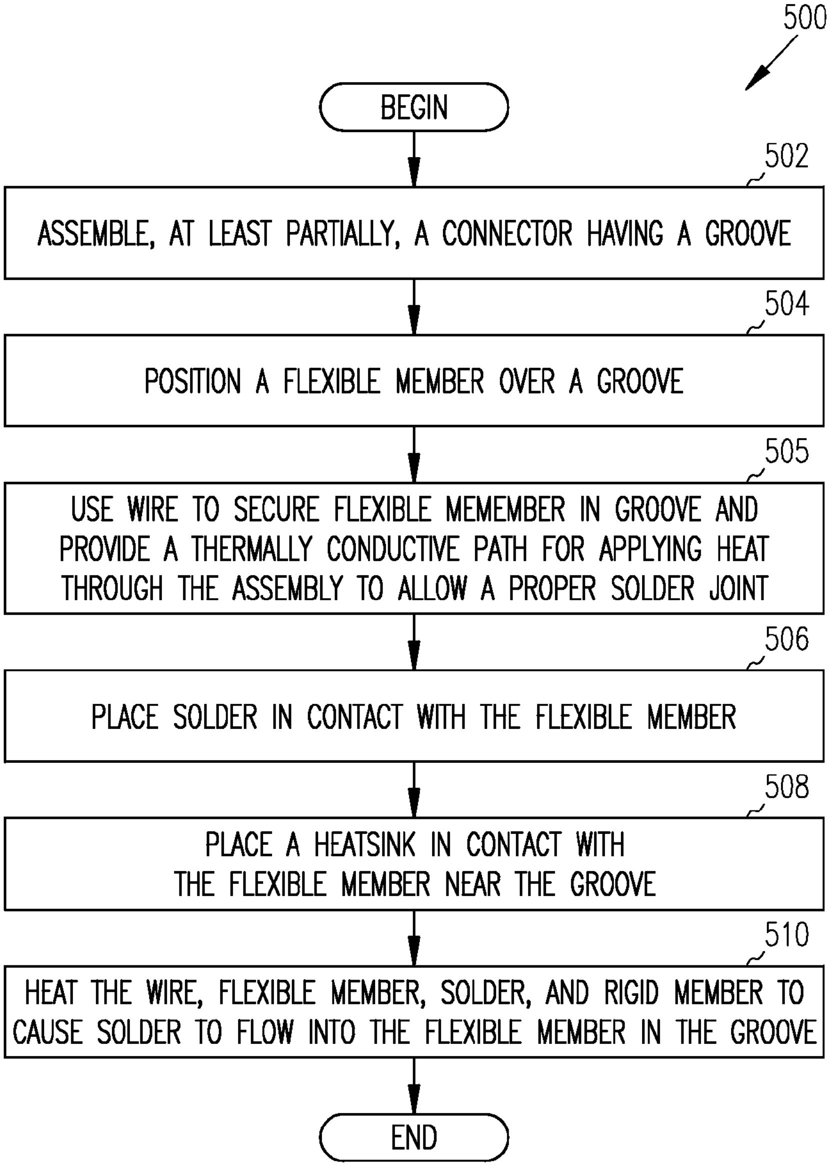
FIG. 5 is a flow diagram of a method for securing the flexible member, shown in FIG. 4, to the substantially rigid member, shown in FIG. 4, in accordance with some embodiments of the present invention.

FIG. 5 is a flow diagram of a method 500 for securing the flexible member 148, shown in FIG. 4, to the substantially rigid member 150, shown in FIG. 4, in accordance with some embodiments of the present invention. Referring to FIG. 1, FIG. 4, and FIG. 5, the method 500 includes assembling, at least partially, the connector 110, shown in FIG. 1, having the groove 154, shown in FIG. 4, (block 502), positioning the flexible member 148 over the groove 154 (block 504), using the wire 402 to secure the flexible member 148 in the groove 154 and provide a thermally conductive path for applying heat through the assembly comprising the wire 402, the flexible member 148, the solder 404 and the substantially rigid member 150 to allow a proper solder joint (block 505), placing the solder 404, shown in FIG. 4, in contact with the flexible member 148 (block 506), placing the heatsink 406, shown in FIG. 4, in contact with the flexible member 148 near the groove 154 (block 508), and heating the wire 402, the flexible member 148, the solder 404 and the substantially rigid member 150 to cause the solder 404 to flow into the flexible member 148 in the groove 154 (block 510).

In some embodiments, securing the flexible member 148 in the groove 154 includes wrapping the wire 402, shown in FIG. 4, in the groove 154 to secure the flexible member 148 between the wire 402 and the groove 154. In some embodiments, placing the solder 404 in contact with the flexible member 148 includes wrapping the solder 404 adjacent to the groove 154. In some embodiments, placing the heatsink 406 in contact with the flexible member 148 near the groove 154 includes placing the heatsink 406 adjacent to the solder 404. In some embodiments, heating the wire 402, the flexible member 148, the solder 404 and the substantially rigid member 150 to cause the solder 404 to flow into the flexible member 148 in the groove 154 includes heating the wire 402, the flexible member 148, the solder 404 and the substantially rigid member 150 by resistive heating. In some embodiments, heating the wire 402, the flexible member 148, the solder 404 and the substantially rigid member 150 by resistive heating includes generating a current in the flexible member 148. In some embodiments, heating the wire 402, the flexible member 148, the solder 404 and the substantially rigid member 150 to cause the solder 404 to flow into the flexible member 148 in the groove 154 includes heating the wire 402, the flexible member 148, the solder 404 and the substantially rigid member 150 using a heat source. In some embodiments, the flexible member 148 includes a conductive braid.

Figure 6:
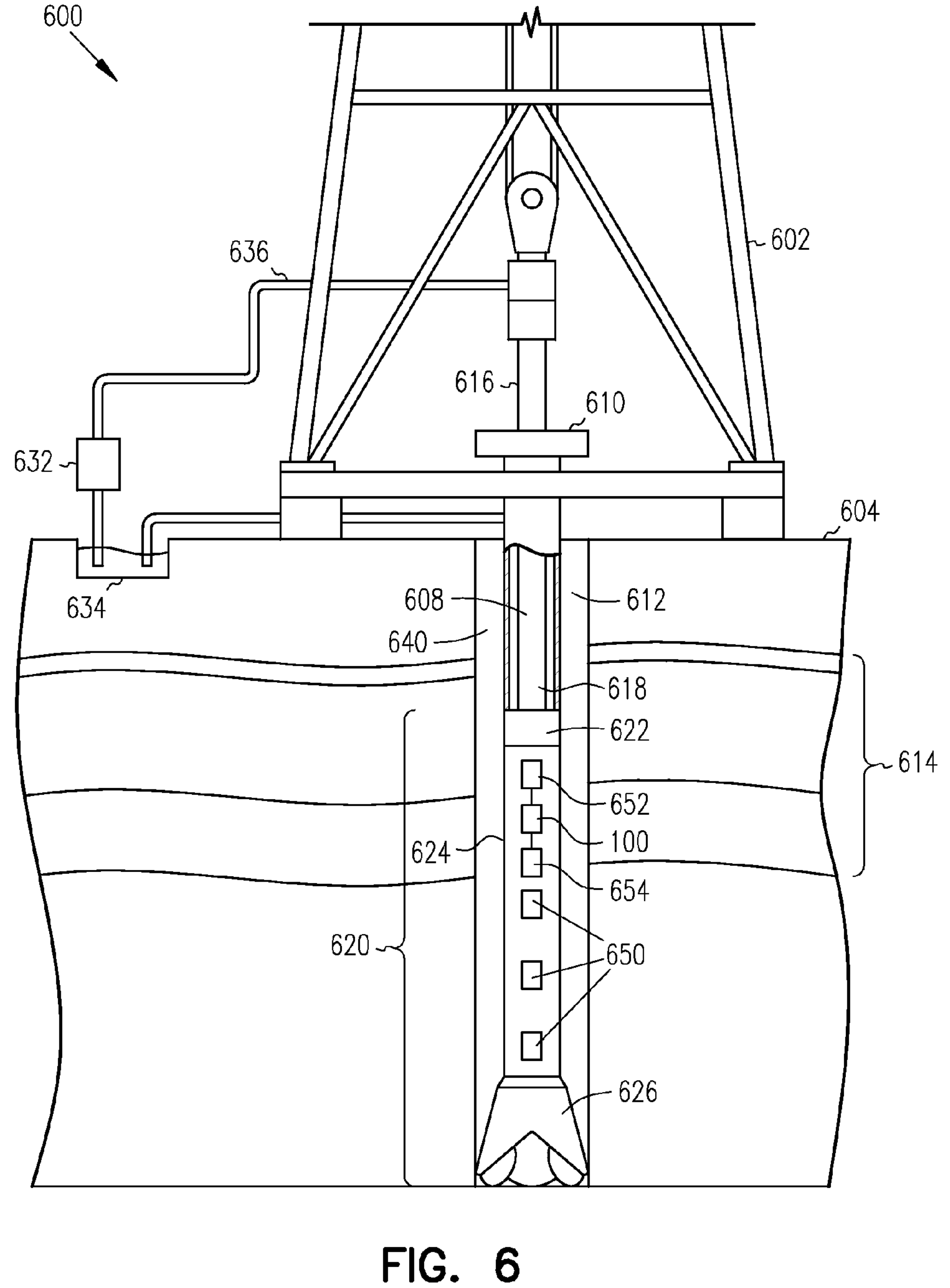
FIG. 6 illustrates a system for drilling operations, in accordance with some embodiments of the present invention.

FIG. 6 illustrates a system 600 for drilling operations in accordance with some embodiments of the present invention. The system 600 includes a drilling rig 602 located at a surface 604 of a well. The drilling rig 602 provides support for a drill string 608. The drill string 608 penetrates a rotary table 610 for drilling a borehole 612 through subsurface formations 614. The drill string 608 includes a Kelly 616 (in the upper portion), a drill pipe 618 and a bottom hole assembly 620 (located at the lower portion of the drill pipe 618). The bottom hole assembly 620 may include drill collars 622, a downhole tool 624 and a drill bit 626. The downhole tool 624 may be any of a number of different types of tools including measurement-while-drilling (MWD) tools, logging-while-drilling (LWD) tools, etc.

During drilling operations, the drill string 608 (including the Kelly 616, the drill pipe 618 and the bottom hole assembly 620) may be rotated by the rotary table 610. In addition or alternative to such rotation, the bottom hole assembly 620 may also be rotated by a motor (not shown) that is downhole. The drill collars 622 may be used to add weight to the drill bit 626. The drill collars 622 also may stiffen the bottom hole assembly 620 to allow the bottom hole assembly 620 to transfer the weight to the drill bit 626. Accordingly, this weight provided by the drill collars 622 also assists the drill bit 626 in the penetration of the surface 604 and the subsurface formations 614.

During drilling operations, a mud pump 632 may pump drilling fluid (known as "drilling mud") from a mud pit 634 through a hose 636 into the drill pipe 618 down to the drill bit 626. The drilling fluid can flow out from the drill bit 626 and return back to the surface through an annular area 640 between the drill pipe 618 and the sides of the borehole 612. The drilling fluid may then be returned to the mud pit 634, where such fluid is filtered. Accordingly, the drilling fluid can cool the drill bit 626 as well as provide for lubrication of the drill bit 626 during the drilling operation. Additionally, the drilling fluid removes the cuttings of the subsurface formations 614 created by the drill bit 626.

The downhole tool 624 may include one to a number of different sensors 650, which monitor different downhole parameters and generate data that is stored within one or more different storage mediums within the downhole tool 624. The type of downhole tool 624 and the type of sensors 650 thereon may be dependent on the type of downhole parameters being measured. Such parameters may include the downhole temperature and pressure, the various characteristics of the subsurface formations (such as resistivity, radiation, density, porosity, etc.), the characteristics of the borehole (e.g., size, shape, etc.), etc. In some embodiments, the downhole tool 624 includes electronic modules 652 and 654 coupled together by the pair of connectors 100, also shown in FIG. 1. Exemplary electronic modules 652 and 654 include acoustic measurement modules, gamma ray measurement modules, data acquisition modules, and data communication modules.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. An apparatus comprising:

a first connector and a second connector, each of the first connector and the second connector including a bulkhead, the first connector being substantially more flexible than the second connector based, at least in part, on the first connector having a conductive flexible member; and two or more conductive paths formed in each of the first connector and the second connector arranged to transmit an electrical signal through the first connector and the second connector, each of the two or more conductive paths in each of the first connector and the second connector being electrically isolated from all other conductive elements in the respective connector;

wherein the two or more conductive paths of the first connector include the conductive flexible member to transmit the electrical signal, at least one of the two or more conductive paths of the first connector including a substantially flexible member, different from the conductive flexible member, located between two substantially rigid members;

wherein the conductive flexible member is substantially surrounded by a flexible, insulative material, the flexible, insulative material is substantially surrounded by the substantially flexible member, and the substantially flexible member is surrounded by a flexible sleeve.

2. The apparatus of claim 1, wherein the apparatus includes a shroud located between the bulkheads of the first and second connectors and disposed about the first and second connectors when the first and second connectors are coupled together electrically.

3. An apparatus comprising:

a first connector and a second connector, each of the first connector and the second connector including a bulkhead, the first connector being substantially more flexible than the second connector based, at least in part, on the first connector having a conductive flexible member;

two or more conductive paths formed in each of the first connector and the second connector arranged to transmit an electrical signal through the first connector and the second connector, each of the two or more conductive paths in each of the first connector and the second connector being electrically isolated from all other conductive elements in the respective connector, wherein the two or more conductive paths of the first connector include the conductive flexible member to transmit the electrical signal, at least one of the two or more conductive paths of the first connector including a substantially flexible member located between two substantially rigid members, wherein the substantially flexible member located between the two substantially rigid members includes a braided conductive element.

4. The apparatus of claim 3, wherein the first connector includes a flexible sleeve disposed along the braided conductive element and encompassing the braided conductive element.

5. The apparatus of claim 4, wherein the flexible sleeve encompasses at least a portion of the first connector that houses the substantially flexible member located between two substantially rigid members.

6. An apparatus comprising:

a first connector and a second connector, each of the first connector and the second connector including a bulkhead, the first connector being substantially more flexible than the second connector based, at least in part, on the first connector having a conductive flexible member;

two or more conductive paths formed in each of the first connector and the second connector arranged to transmit an electrical signal through the first connector and the second connector, each of the two or more conductive paths in each of the first connector and the second connector being electrically isolated from all other conductive elements in the respective connector, wherein the two or more conductive paths of the first connector include the conductive flexible member to transmit the electrical signal, at least one of the two or more conductive paths of the first connector including a substantially flexible member located between two substantially rigid members, wherein the substantially flexible member is soldered to the two substantially rigid members in a groove in the bulkhead of the first connector.

* * * * *